United States Patent [19]

Harr

[11] 4,271,677
[45] Jun. 9, 1981

[54] SELF-CONTAINED ROOF-MOUNTED VEHICLE AIR-CONDITIONING SYSTEM

[76] Inventor: Forrest Harr, 3244 W. Columbine Dr., Phoenix, Ariz. 85029

[21] Appl. No.: 890,201

[22] Filed: Mar. 27, 1978

[51] Int. Cl.³ .................. F25B 49/00; B60H 3/04
[52] U.S. Cl. ............................ 62/127; 62/244; 62/323.1; 320/56
[58] Field of Search ............... 62/244, 127, 323 R, 62/323 C, 228 C, 239, 134, 320 C; 290/1 R, 1 A, 4 C, 4 R; 320/56

[56] References Cited

U.S. PATENT DOCUMENTS

| | | | |
|---|---|---|---|
| 1,926,849 | 9/1933 | Gray | 320/56 X |
| 2,766,439 | 10/1956 | Palm | 340/222 |
| 2,799,143 | 7/1957 | Weigel | 62/3 |
| 2,869,333 | 1/1959 | Hoiby et al. | 62/239 |
| 3,218,821 | 11/1965 | Spatt | 62/244 |
| 3,236,060 | 2/1966 | Clark, Jr. | 62/135 |
| 3,841,108 | 10/1974 | Pierrat | 62/236 |
| 3,844,130 | 10/1974 | Wahnish | 62/133 |

Primary Examiner—William E. Wayner
Assistant Examiner—Harry Tanner
Attorney, Agent, or Firm—Drummond and Nelson

[57] ABSTRACT

A self-contained air-conditioning system for a vehicle, adapted to be mounted on the vehicle roof. The air-conditioning system includes an air refrigeration system comprising compressor, evaporator, condenser and fans operatively associated therewith, an auxiliary electrical generator, independent of the main vehicle electrical system, and an auxiliary gasoline engine for driving the refrigeration compressor and the auxiliary electrical generator. A circuit provides electrical power from the auxiliary generator to the refrigeration system fans and also provides supplemental electrical power from the auxiliary generator to the primary electrical system of the vehicle.

The self-contained air-conditioning system may also optionally include remote control means for controlling and monitoring the system. These controls and indicators are adapted for mounting within the driver's compartment of the vehicle and include switches for starting the auxiliary engine, energizing the fans and means for indicating the running condition of the engine.

1 Claim, 5 Drawing Figures

SELF-CONTAINED ROOF-MOUNTED VEHICLE AIR-CONDITIONING SYSTEM

This invention relates to a self-contained air-conditioning system for a vehicle.

More particularly, the invention pertains to a self-contained air-conditioning system which does not draw operational power from either the vehicle prime mover or the vehicle's primary electrical system.

In a further and more specific respect, the invention relates to a self-contained vehicle air-conditioning system including an auxiliary electrical generator which provides electrical power for both the self-contained air-conditioning system and which also provides supplemental electrical power to the primary electrical system of the vehicle.

In still another further and more specific respect, the invention relates to a roof-mounted self-contained air-conditioning system for a vehicle having means for remotely controlling and monitoring the system, the means being adapted for mounting within the driver's compartment of the vehicle such that the driver can control the entire system without leaving his driver's seat.

Systems for air-conditioning large vehicles, such as motor homes, busses and the like generally consist of a refrigeration compressor with associated evaporator and condenser coils and fans for removing hot air from the interior of the vehicle, passing it across the evaporator coils and returning the cooled air to the interior of the vehicle. Other fans are provided for moving ambient air across the condenser coils to assist in the function of discharging the heat extracted from the interior air to the ambient atmosphere.

While certain of these air-conditioning systems are powered by electricity supplied by the primary electrical system of the vehicle, it is more common to provide an auxiliary electrical generator, usually located at a remote location in the vehicle, which powers electrical motors driving the compressor and the fans.

It is also known to provide an auxiliary engine, separate from the vehicle prime mover, which drives the refrigeration compressor and also is mechanically connected to an auxiliary generator, separate from the primary vehicle electrical system, which supplies current to the other electrical components of the refrigeration system. For example, such a system is described in the patent to Spatt, U.S. Pat. No. 3,218,821.

As is well known to those skilled in the art, the operator of a very large vehicle such as a motor home, having a plurality of accessories such as heaters, furnaces, cooking stoves, refrigerators, flush toilets, etc., is frequently faced with a situation where the primary electrical system of the vehicle is unable to meet the demands of all of the separate systems and must either curtail the use of one or more of these accessories or risk discharging the storage batteries of the primary electrical system. Whether for this reason or for any other reason which would run the storage batteries of the main system down, it would be highly advantageous to provide for supplying supplemental electrical power to the primary electrical circuit.

Accordingly, it is a principle object of the present invention to provide a compact self-contained air-conditioning system, especially adapted for roof-mounting on large vehicles, such as motor homes, busses, truck cabs, etc.

A further object of the invention is to provide a self-contained air-conditioning system especially adapted to provide supplemental electrical power to the primary electrical circuit of the vehicle on which the air-conditioning system is mounted.

Still another object of the invention is to provide a self-contained air-conditioning system which can be conveniently operated and monitored from the driver's seat of the vehicle.

These and other, further and more specific objects and advantages of the invention will be apparent to those skilled in the art from the following detailed description thereof, taken in conjunction with the drawings, in which.

Briefly, in accordance with my invention, I provide a self-contained air-conditioning system for a vehicle having a prime mover, a primary electrical system and a plurality of electrical accessories powered by the primary electrical system. The self-contained air-conditioning system of my invention includes an air-conditioning system comprising compressor, evaporator and condenser means and fan means operatively associated therewith, for removing air from the interior of the vehicle, cooling it and returning the cooled air to the interior of the vehicle. The self-contained system also includes an auxiliary electrical generator driven by an auxiliary gasoline engine, provided with a self-starter. The auxiliary engine also drives the auxiliary electrical generator. Circuit means are included for providing electrical power from the auxiliary electrical generator to the fans of the refrigeration system and also for providing supplemental electrical power to the primary electrical system of the vehicle.

In accordance with a preferred embodiment of the invention, the self-contained air-conditioning system optionally includes means for remotely controlling and monitoring the system, adapted for mounting within the driver's compartment of the vehicle. These means include switches for starting and operating the engine and for energizing the fans and appropriate indicator lights and timing devices for indicating the running condition of the engine.

Figure 1:
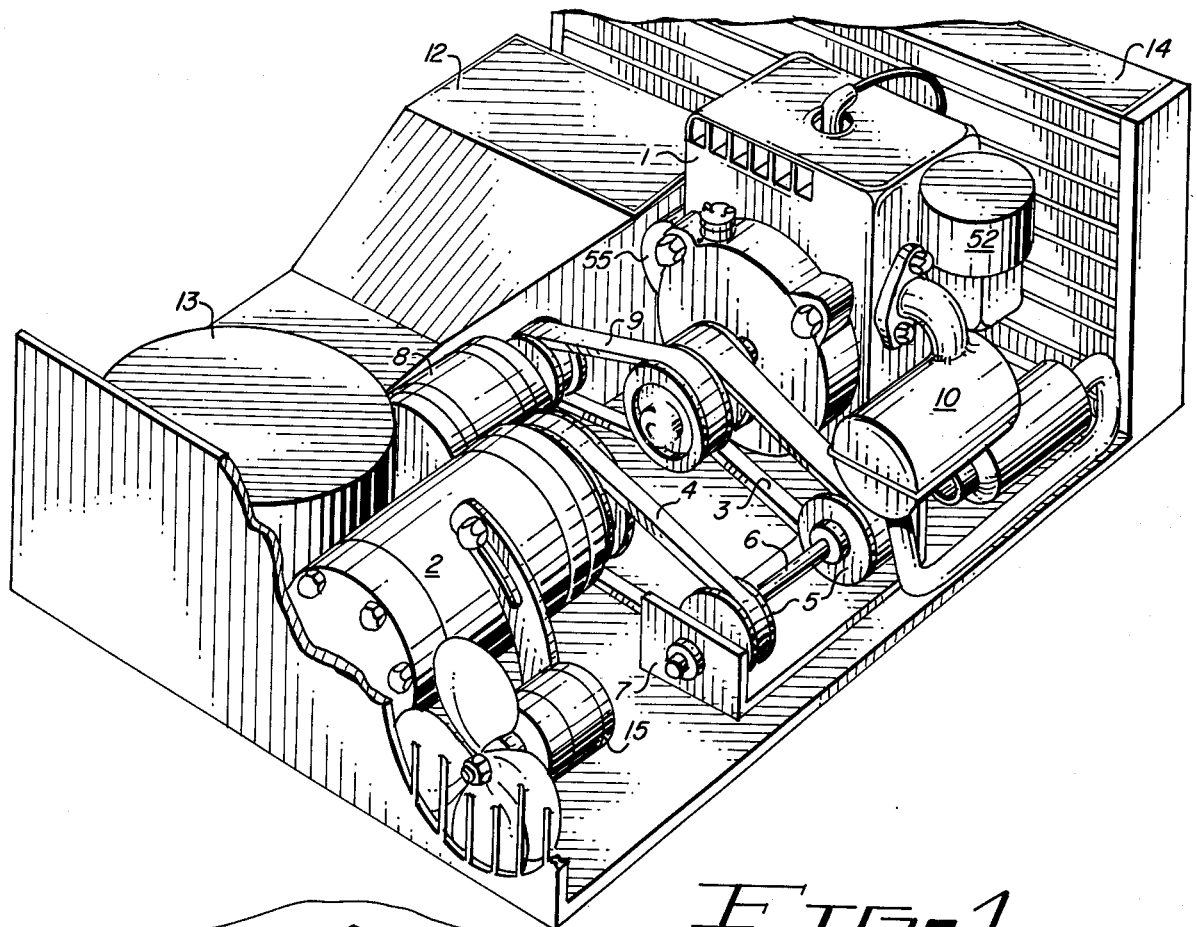
FIG. 1 is a partially cut-away sectional view of a self-contained roof-mounted air-conditioning system embodying the principles of the present invention (with the cover removed for clarity)
Figure 4:
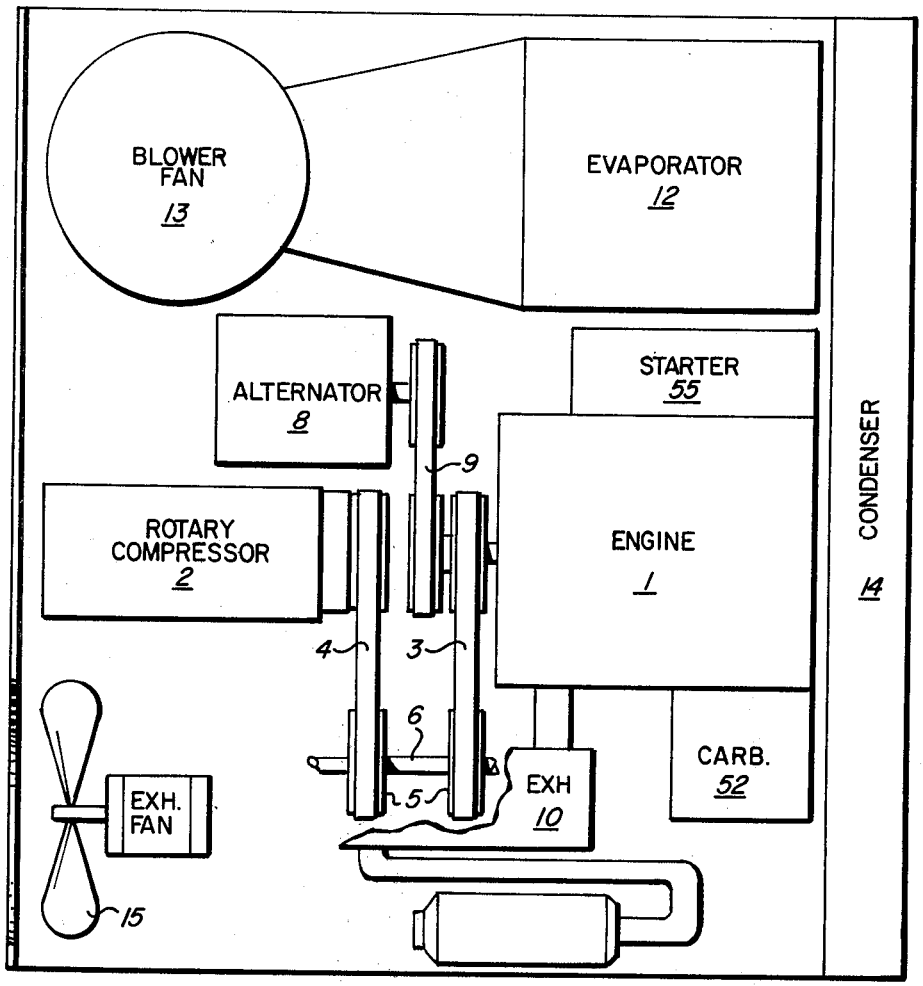
FIG. 4 is a schematic plan view showing the location of the components of the system of FIG. 1.

Turning now to the drawings, in which like reference numerals indicate corresponding parts in the several views, as shown in FIGS. 1 and 4, the self-contained air-conditioning system includes an auxiliary gasoline engine 1 which drives a rotary refrigeration compressor 2 through V-belts 3 and 4 connected to pulleys 5 carried on a common shaft 6 journalled into a suitable frame 7. The engine 1 also drives an alternator 8 through the V-belt 9. The engine is provided with a suitable muffler system 10 and is provided with electrically operated self-starter 55. The compressed refrigerant flows from the compressor 2 through the condenser coils 14 where heat is exchanged to the ambient atmosphere. The refrigerant then passes through the evaporator coils 12 where, after expansion, it absorbs heat from the air passed across the outside of the evaporator coils 12 from the interior of the vehicle. An exhaust fan 15 is provided to draw air across the condenser coils 14 when the vehicle is not in motion.

Figure 2:
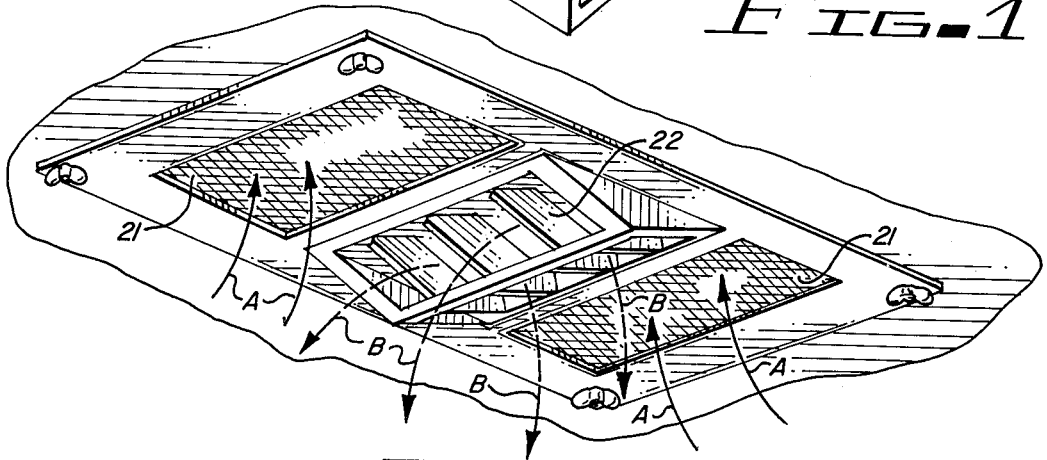
FIG. 2 is a perspective view of the air inlet and discharge system located in the ceiling of the vehicle.
Figure 3:
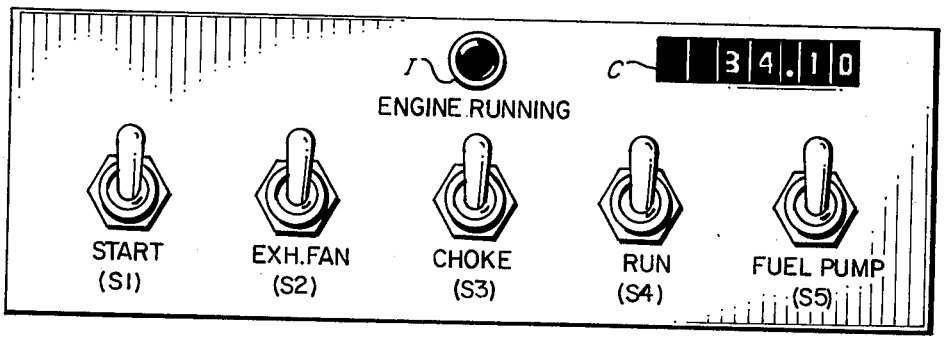
FIG. 3 is a plan view of the switch panel for controlling and monitoring the operation of the systems of FIGS. 1-2.

The suction side of the blower fan 13 is connected by ducts to intake coils 21, as shown in FIGS. 2, through which air is drawn in the direction of the arrows A. The air discharged from the blower fan 13, after passing across the cooling coils 12, is directed downwardly in the direction of the arrows B through louvers 22 and thence into the interior of the vehicle.

Figure 5:
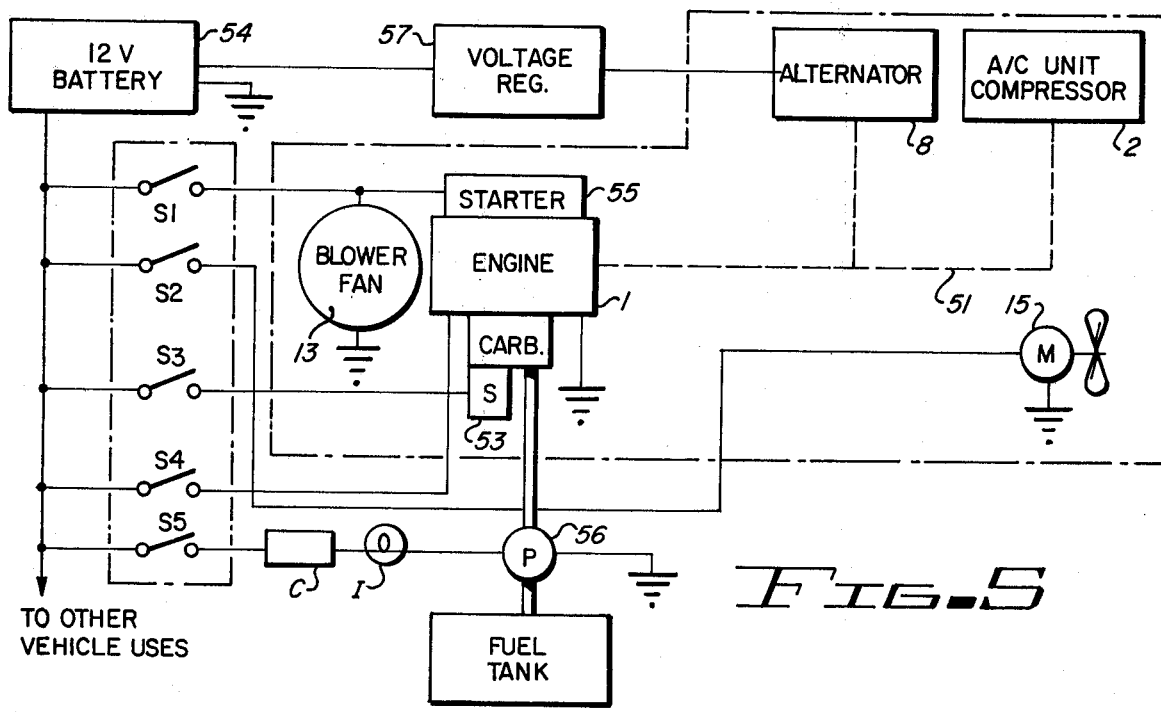
FIG. 5 is an electrical schematic illustrating the circuitry of the system of FIGS. 1-4.

Referring to FIG. 5, the auxiliary engine 1 is mechanically connected as indicated by the dashed lines 51 to the alternator 8 and the compressor 2. The carburetor 52 of the auxiliary engine 1 is provided with an electrical solenoid 53 which operates the choke linkage of the carburetor. The solenoid is connected through switch S3 to the primary ignition system storage battery 54. The electrical starter motor 55 of the auxiliary engine 1 is also connected to the storage battery 54 through switch S1. The ignition circuit of the auxiliary engine 1 is connected to the storage battery 54 through switch S4, indicator lamp I and timer clock C. The fuel pump 56 for the auxiliary engine 1 is also powered by the storage battery 54 through switch S5. The exhaust fan 15 is powered by the storage battery 54 through switch S2. Supplemental power from the alternator 8 is provided through the voltage regulator 57 to the storage battery 54.

The switches S1–S5, the indicator lamp I and the timer clock C are grouped in a panel as shown in FIG. 2 for convenient mounting within the driver's compartment of the vehicle. To operate the self-contained, air-conditioning system, the fuel pump switch S5, engine run switch S4 and choke switch S3 are closed and the start switch S1 is depressed until the auxiliary engine 1 starts. After a suitable warm-up period, the choke switch S3 is opened. Unless the vehicle is in motion, the exhaust fan switch S2 is closed to cause movement of air across the condenser coils 14, as explained above. Indicator lamp I will be lighted when the engine is running and the digital readout of the clock C indicates the cumulative running time on the engine, to warn the operator of the need for performing preventive maintenance and fueling operations.

As will be observed by those skilled in the art, the system described above provides a convenient and effective method for cooling the interior of various vehicles, such as motor homes, trucks, busses, etc., without placing an added drain on either the primary electrical system of the vehicle or the vehicle prime mover. In addition, the system of the present invention provides a convenient source of supplemental power to charge the main vehicle storage battery and provide supplemental power for the other electrical accessories of the vehicle.

Having described my invention in such terms as to enable those skilled in the art to understand and practice it and having identified the presently preferred embodiments thereof, I claim:

1. A roof-mounted, self-contained air-conditioning system for cooling air drawn from the interior of a vehicle and directing said cooled air back into said vehicle, said vehicle having a prime mover for said vehicle, a primary electrical system, driven by said prime mover, for generating and storing electrical energy, and a plurality of electrical accessories, powered by the electrical energy generated and stored by said primary electrical system, said self-contained air-conditioning system including:
(a) an air refrigeration system comprising compressor, evaporator and condenser means and fan and duct means operatively associated therewith, for removing air from the interior of said vehicle, cooling said removed air and returning the cooled air to the interior of said vehicle, said duct means having intake and return vents mounted in the ceiling of said vehicle;
(b) an electrical generator;
(c) a gasoline engine, provided with a self-starter, for driving
  (i) said compressor means, and
  (ii) said electrical generator;
(d) pulley means for transmitting motive power from said engine to said compressor means and said electrical generator;
(e) circuit means for
  (i) providing electrical power from said electrical generator to said fan means; and
  (ii) providing supplemental electrical power from said electrical generator to the primary electrical system of said vehicle;
(f) means for controlling and monitoring said self-contained air conditioning system, adapted for mounting within the operator's compartment of said vehicle, said means including switch means for starting said auxiliary gasoline engine and for energizing said fan means and means for indicating the running condition of said engine; and
(g) means for warning the operator of said vehicle when preventive maintenance of said self-contained air conditioning system is required, said warning means including clock means for maintaining a cumulative record of the time said air conditioning system has been operated.

* * * * *